United States Patent [19]

Krambeck et al.

[11] Patent Number: 4,644,738
[45] Date of Patent: Feb. 24, 1987

[54] TWIN SICKLE CUTTER BAR

[75] Inventors: Frederick C. Krambeck; Craig A. Richardson; James C. Walters, all of Ottumwa, Iowa

[73] Assignee: Deere & Company, Moline, Ill.

[21] Appl. No.: 792,391

[22] Filed: Oct. 29, 1985

[51] Int. Cl.⁴ .............................................. A01D 53/12
[52] U.S. Cl. .......................................... 56/259; 56/297
[58] Field of Search ................ 56/259, 296, 297, 309, 56/311

[56] References Cited

U.S. PATENT DOCUMENTS

| | | | |
|---|---|---|---|
| 3,508,388 | 4/1970 | Buchhole | 56/297 |
| 3,577,716 | 5/1971 | McCarty et al. | 56/259 |
| 4,236,370 | 12/1980 | Shaver | 56/297 |
| 4,246,742 | 1/1981 | Clark et al. | 56/259 |

Primary Examiner—Gene Mancene
Assistant Examiner—David I. Tarnoff

[57] ABSTRACT

A sickle-type mower includes a cutter bar assembly having a pair of sickles mounted for reciprocable motion along respective cutter bars. The sickles include inner knife sections located to cut against stub guards mounted at inner locations of the cutter bars, with the inner knife section of the upper sickle being disposed to cut against a finger of a double hold-down located centrally along the cutter bar assembly with its fingers disposed above respective stub guards located on opposite side of the centerline of the bar assembly.

3 Claims, 7 Drawing Figures

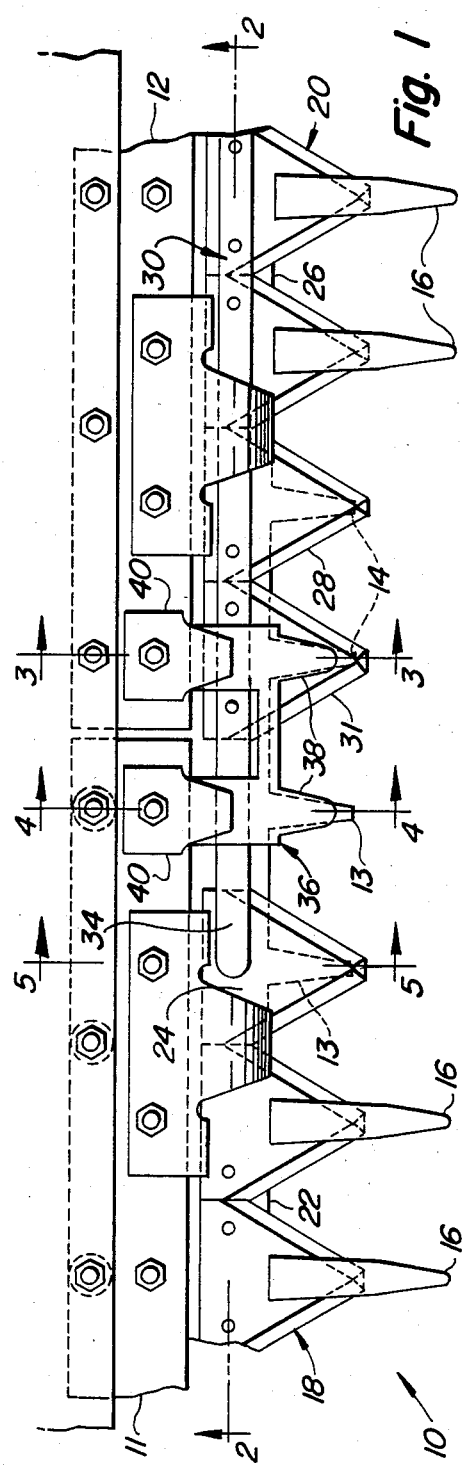
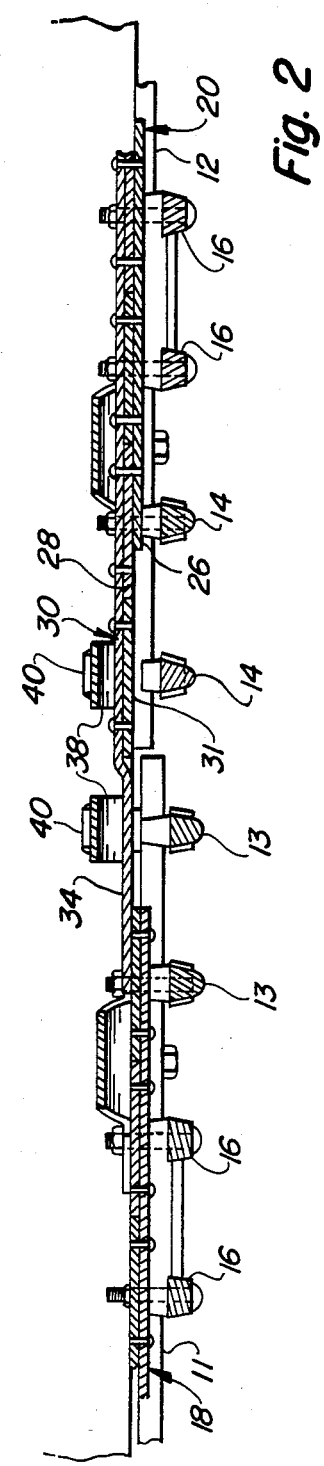

U.S. Patent  Feb. 24, 1987  Sheet 3 of 3  4,644,738

TWIN SICKLE CUTTER BAR

BACKGROUND OF THE INVENTION

The present invention relates to sickle-type mowers and more particularly relates to cutter bars including a pair of sickle or knife assemblies.

As mowing machines such as windrowers or mower conditioners and the like have become larger, it has become necessary to use cutter bars including a pair of sickle assemblies in order to reduce the mass of a given sickle assembly and in that way reduce forces. While the usage of two sickle assemblies per cutter bar has reduced forces, it has given rise to the problem of how to design the sickle assemblies so that crop encountered by the central portion of the cutter bar, where the two sickle assemblies meet, is cut.

U.S. Pat. No. 3,577,716, granted on May 4, 1971, discloses a twin sickle cutter bar designed or ensuring that crop encountered by the middle portion of the cutter bar is cut. However, the design requires that an end knife of one sickle assembly be arranged to cut against an end knife of the other sickle assembly. This then requires that the drives for the two sickle assemblies be timed so that the end knives meet for proper cutting. Also the design requires that the end knife of one of the sickle assemblies be inverted, thus requiring special attention during manufacture of the sickle assembly.

U.S. Pat. No. 4,246,742, granted on Jan. 27, 1981, also discloses a twin sickle cutter bar design wherein end knives of one sickle assembly cut against end knives of the other sickle assembly, and therefore, also requires the drives for the sickle assemblies to be timed for proper cutting operation. Also, certain ones of the knives are special since they are unsharpened.

U.S. Pat. No. 4,236,370, granted on Dec. 2, 1980, discloses a twin sickle cutter bar design wherein the end of one sickle is provided with an extension that carries inverted knives which cut against upper ledger surfaces of a set of special knife guards having upper and lower ledger surfaces.

SUMMARY OF THE INVENTION

According to the present invention, there is provided an improved twin sickle cutter bar.

A broad object of the invention is to provide a twin sickle cutter bar that utilizes a minimum of specially made or mounted parts and which is designed so that there is no need to have the sickle drives timed for proper cutting operation.

A more specific object is to provide a twin sickle cutter bar wherein one sickle operates at a level a knife thickness above the other sickle and includes an end knife section which cuts against a guard element and a hold-down element on the inward stroke of the one sickle and against another guard element on the outward stroke.

These and other objects will become apparent from a reading of the following description together with the appended drawing.

BRIEF DECRIPTION OF THE DRAWINGS

FIG. 1 is a top plan view of the central area of a twin knife cutter bar assembly showing the right- and left-hand sickles at outer stroke locations.

FIG. 2 is a vertical sectional view of the cutter bar assembly taken along line 2—2 of FIG. 1.

Figure 3:
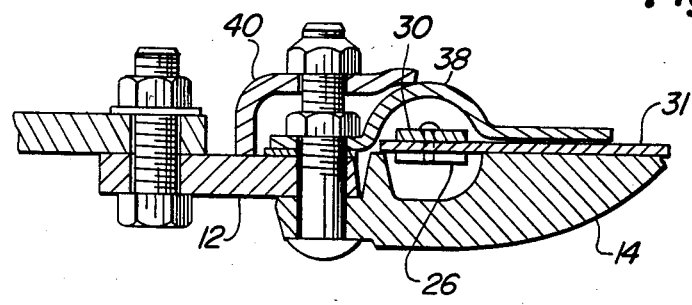
Figure 4:
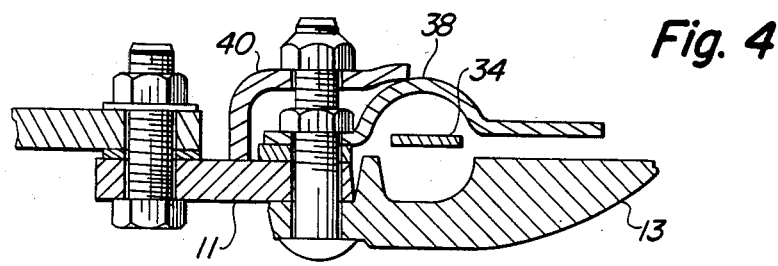
Figure 5:
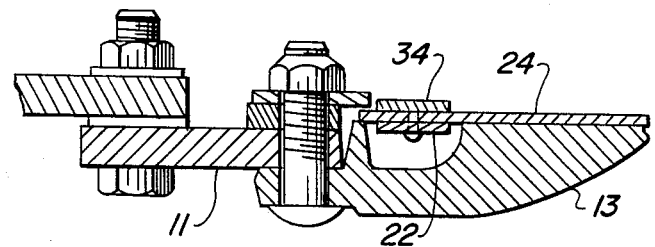

FIGS. 3, 4 and 5 are vertical sectional views taken respectively along lines 3—3, 4—4 and 5—5 of FIG. 1.

Figure 6:
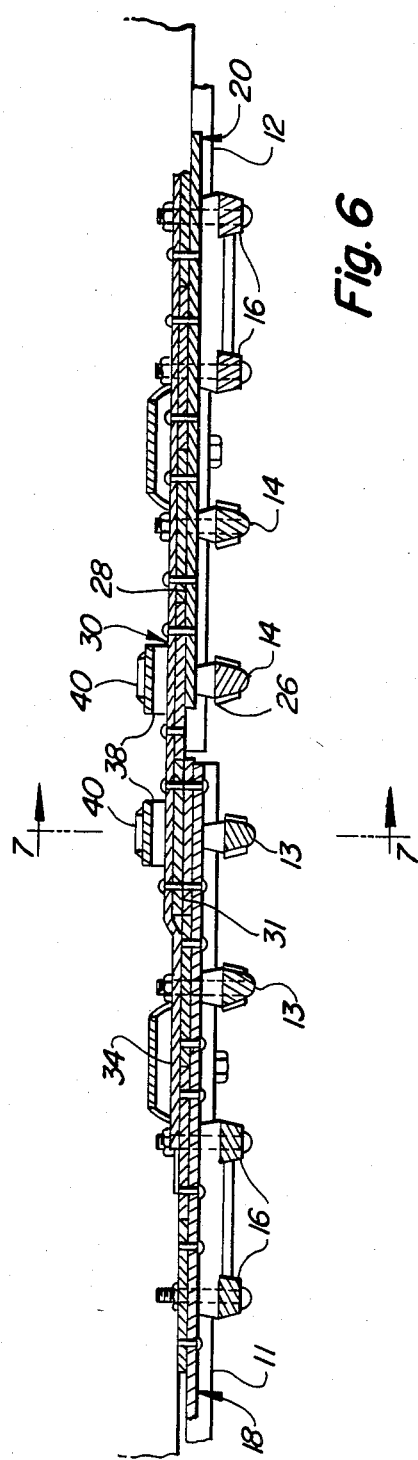

FIG. 6 is a view like FIG. 2 but showing the right- and left-hand sickles at inner stroke locations.

Figure 7:
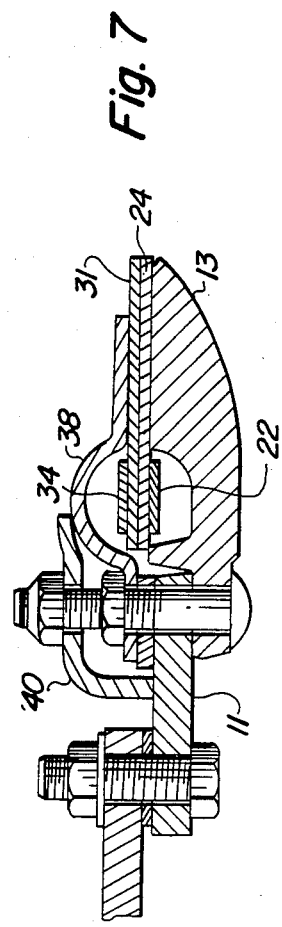

FIG. 7 is a vertical sectional view taken along line 7—7 of FIG. 6.

DESCRIPTION OF THE PREFERRED EMBODIMENT

Referring now to the drawings, there is shown a twin sickle cutter bar assembly 10 including, as considered facing in a forward direction of travel, right- and left-hand cutter bars 11 and 12, respectively. A first pair of stub or nonclog guards 13 are secured at spaced locations at the inner end of the cutter bar 11 and a second pair of stub guards 14 are secured at spaced locations at the inner end of the cutter bar 12. A plurality of guards 16 are secured along each of the bars 11 and 12 in opposite directions from the pairs of stub guards. As viewed in FIG. 1, the cutter bar assembly 10 includes right- and left-hand sickles 18 and 20, respectively. The sickle 18 includes an elongate knife back 22 having a plurality of knife sections riveted thereto with a knife section 24 being at the inner end of the knife back. Similarly, the sickle 20 includes an elongate knife back 26 having a plurality of knife sections riveted thereto with a knife section 28 being at the inner end of the knife back. A knife back extension 30 overlies a plurality of the knife sections at the inner end portion of the knife back 26 and the rivets which secure these knife sections to the knife back also secure the extension to the knife back. Also riveted to the extension 30 at a location leftwardly of the extension to the knife back is a knife section 31. The extension 30 includes an inner, downwardly offset end portion 34 which extends beyond the knife back 26 and engages the top of the inner end of the sickle 18. A double hold-down 36 is centrally located on the cutter bar 12 and includes a pair of hold-down fingers 38 which are respectively arranged directly above the center two of the four no-clog guards 13 and 14. A pair of hold-down clips 40 are associated with the hold-down 36.

As can best be seen in FIGS. 2 through 7, the right-hand cutter bar 11 is a knife section thickness lower than the left-hand cutter bar 12 and the hold-down 36 is shimmed so that the knife sections at the inner end portions of the respective sickles 18 and 20 can operate in a central zone of the cutter bar assembly 10 without interfering with each other.

It is here noted that all of the knife sections are identical and that all, except for the section 31 which is mounted to the underside of knife back extension 30, are positioned identically atop their respective knife back so that no extraordinary care is required during assembly as would be the case, for example, if some knife sections were different than the others or if some knife sections were mounted upside down relative to the others.

The operation of the cutter bar assembly 10 is as follows. A drive (not shown) is coupled to each of the sickles 18 and 20 and operates to reciprocate the associated sickle along its cutter bar. At the critical zone at the center portion of the cutter bar assembly 10, the end knife section 24 of the right-hand sickle 18 cuts against the innermost one of the pair of stub guards 13 on the inward stroke of the sickle and against the other stub guard 13 on the outward stroke. On the other hand, the end knife section 31 of the left-hand sickle 20 cuts against the innermost one of the pair of stub guards 13 and the hold-down 36 on the inward stroke of the sickle and against the innermost one of the pair of stub guards 14 on the outward stroke of the sickle. The cutting action of the knife section 31 against the hold-down 36 has been found to be effective even though the bevel on the knife section 28 begins on the top of the section just like every other knife section.

Thus, it will be appreciated that the cutter bar assembly 10 utilizes a minimum of special parts and does not require different positioning of like parts. Further, because the knife sections all cut against fixed members, there is no requirement that the drives for the sickles be timed for ensuring suitable cutting operations in the zone at the center of the cutter bar assembly.

We claim:

1. In a cutter bar assembly including a transversely extending cutter bar means, first and second sets of knife guards fixed to the cutter bar means respectively at opposite sides of a longitudinal centerline passing through the cutter bar means and first and second sickles respectively supported by the first and second sets of knife guards for being stroked inwardly and outwardly along the cutter bar means with the first sickle operating in a plane displaced below the second sickle so as to permit inner end portions of the sickles to operate in overlapping areas without interference, said sickles each including a knife back and a plurality of identical knife sections secured to the knife back and with the first sickle including an end knife section at an inner end of the knife back and with the second sickle having a knife back extension at its inner end, the improvement comprising: said first set of knife guards including at least one stub guard mounted to the cutter bar means adjacent said centerline of the cutter bar means; a knife hold-down means mounted to the cutter bar means and including a finger portion disposed above said stub guard; and the second sickle including an end knife section mounted to the knife back extension and located so as to cut against the finger portion and the stub guard.

2. In a cutter bar assembly as defined in claim 1 wherein the first set of knife guards includes a second stub guard disposed adjacent the first mentioned stub guard.

3. In a cutter bar assembly as defined in claim 1 wherein the second set of knife guards includes a stub guard located adjacent said centerline and said hold-down means including a second finger portion located above the last mentioned stub guard.

* * * * *